United States Patent
Yabe

(10) Patent No.: US 6,397,996 B1
(45) Date of Patent: Jun. 4, 2002

(54) STARTING CLUTCH

(75) Inventor: Hiroshi Yabe, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/522,181

(22) Filed: Mar. 9, 2000

(30) Foreign Application Priority Data

Mar. 23, 1999 (JP) .......................................... 11-077310

(51) Int. Cl.$^7$ ..................... F16D 25/0638; F16D 13/74; F16D 13/54
(52) U.S. Cl. ................. 192/55.61; 192/70.12; 192/70.17; 192/85 AA; 192/212; 192/113.34
(58) Field of Search ........................... 192/55.61, 58.42, 192/70.12, 70.17, 70.2, 85 AA, 113.34, 205, 212

(56) References Cited

U.S. PATENT DOCUMENTS

| | | | | |
|---|---|---|---|---|
| 5,261,516 A | * | 11/1993 | Friedmann | 192/70.17 |
| 5,533,815 A | * | 7/1996 | Schierling et al. | 192/70.17 X |
| 5,762,172 A | * | 6/1998 | Tsukamoto et al. | 192/3.29 |
| 5,813,508 A | * | 9/1998 | Shoji et al. | 192/55.61 X |
| 5,927,452 A | * | 7/1999 | Freise et al. | 192/55.61 X |
| 6,142,280 A | * | 11/2000 | Koike | 192/70.12 X |
| 6,179,106 B1 | * | 1/2001 | Masuda | 192/212 X |

FOREIGN PATENT DOCUMENTS

JP   10-131983   * 5/1998

* cited by examiner

Primary Examiner—Rodney H. Bonck
(74) Attorney, Agent, or Firm—Miles & Stockbridge P.C.

(57) ABSTRACT

In a starting clutch comprising a wet type multi-plate clutch having a clutch case, a housing attached to an output shaft of an engine and adapted to cover the wet type multi-plate clutch, and a damper disposed between the wet type multi-plate clutch and the housing, the damper is constituted by a spring, a retainer plate for holding the spring, and a pawl portion elastically engaging with the spring, and the retainer plate is attached to the housing and the pawl portion is attached to the clutch case.

4 Claims, 2 Drawing Sheets

STARTING CLUTCH

BACKGROUND OF THE INVENTION

1. Field of the Invention

The present invention relates to a starting clutch which can be used in place of a torque converter in a motor vehicle or the like.

2. Related Background Art

FIG. 2 is an axial sectional view of a conventional starting clutch. Now, a conventional technique will be described with reference to FIG. 2. A starting clutch 100 includes a multi-plate clutch 101. Within a clutch case 106 of the multi-plate clutch 101, friction plates 102 which are output side friction engaging elements, and separator plates 103 and a backing plate 104, which are input side friction engaging elements, are alternately arranged. A left side (in FIG. 2) of the backing plate 104 is supported by a stop ring 105. At a right side of the friction engaging elements, there is disposed a piston 108 arranged within the clutch case 106 with an O-ring 107 therebetween. The piston is biased toward the right (in FIG. 2) by a return spring 116 so that the friction engaging elements are normally brought to a non-engaged condition. Further, an oil chamber 109 is defined between the piston 108 and the clutch case 106.

The starting clutch 100 comprises the multi-plate clutch 101 having the above-mentioned arrangement, a housing 110 covering an outer periphery of the multi-plate clutch 101, and a damper 117 disposed between the clutch case 106 and the housing 110. The housing 110 is connected to an output shaft 111 of an engine (not shown). A retainer plate 113 is disposed in the damper 117. The retainer plate 113 holds a spring 130 and is attached to an outer periphery of the clutch case 106. A pawl portion 114 elastically engages the spring 130 and is secured to an inner wall of the housing 110.

When oil pressure is supplied to the oil chamber 109 through an oil passage for supplying oil to the starting clutch 100, the piston 108 is operated to achieve a friction engaging condition.

However, in the conventional starting clutch, since the retainer plate 113 for holding the spring 130 is a relatively heavy member and is attached to the outer periphery of the clutch case 106, a weight of a clutch side portion of a wet type multi-plate clutch is increased. Thus, a bearing having a relatively great size must be used and a wider attachment space must be reserved accordingly. Further, since an oil passage for supplying cooling oil to the wet type clutch is formed in the shaft, a disadvantageous condition regarding strength occurs.

SUMMARY OF THE INVENTION

Accordingly, an object of the present invention is to provide a starting clutch which is compact and in which a weight of a clutch side portion is reduced and a disadvantageous condition regarding strength is eliminated.

To achieve the above object, the present invention provides a starting clutch comprising a wet type multi-plate clutch having a clutch case, a housing attached to an output shaft of an engine and adapted to cover the wet type multi-plate clutch, and a damper disposed between the wet type multi-plate clutch and the housing, and wherein the damper is constituted by a spring, a retainer plate for holding the spring, and a pawl portion elastically engaging the spring, and the retainer plate is attached to the housing and the pawl portion is attached to the clutch case. Further, in the starting clutch, the pawl portion may be spline-connected to the clutch case.

Among the structural elements of the damper, the retainer plate for holding the spring may be attached to an inner wall of the housing, and the pawl portion may be attached to outer periphery of the clutch case by spline fitting. In this way, a weight acting on the clutch side can be reduced.

DESCRIPTION OF THE PREFERRED EMBODIMENT

Figure 1:
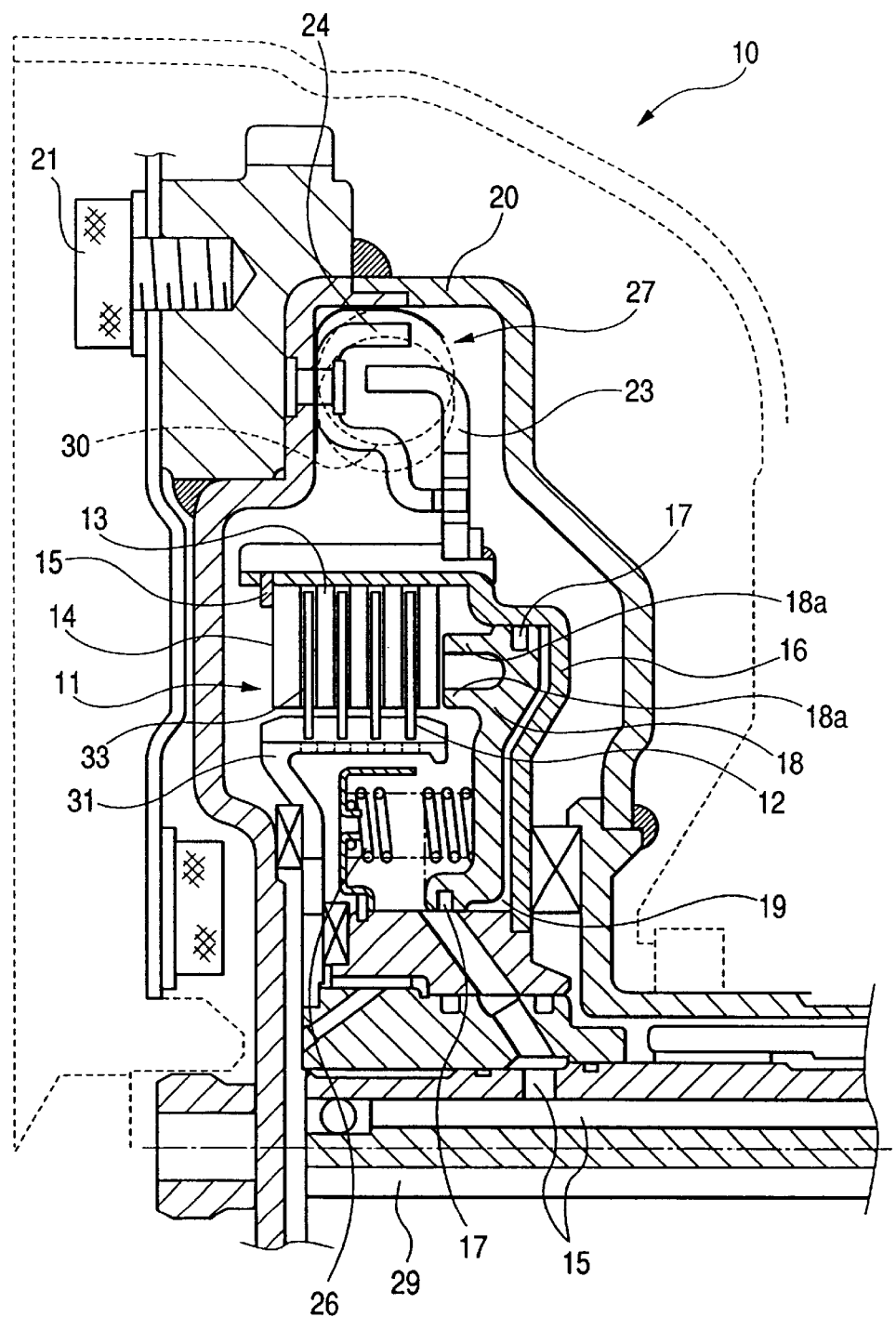
FIG. 1 is an axial sectional view of a starting clutch according to an embodiment of the present invention.
Figure 2:
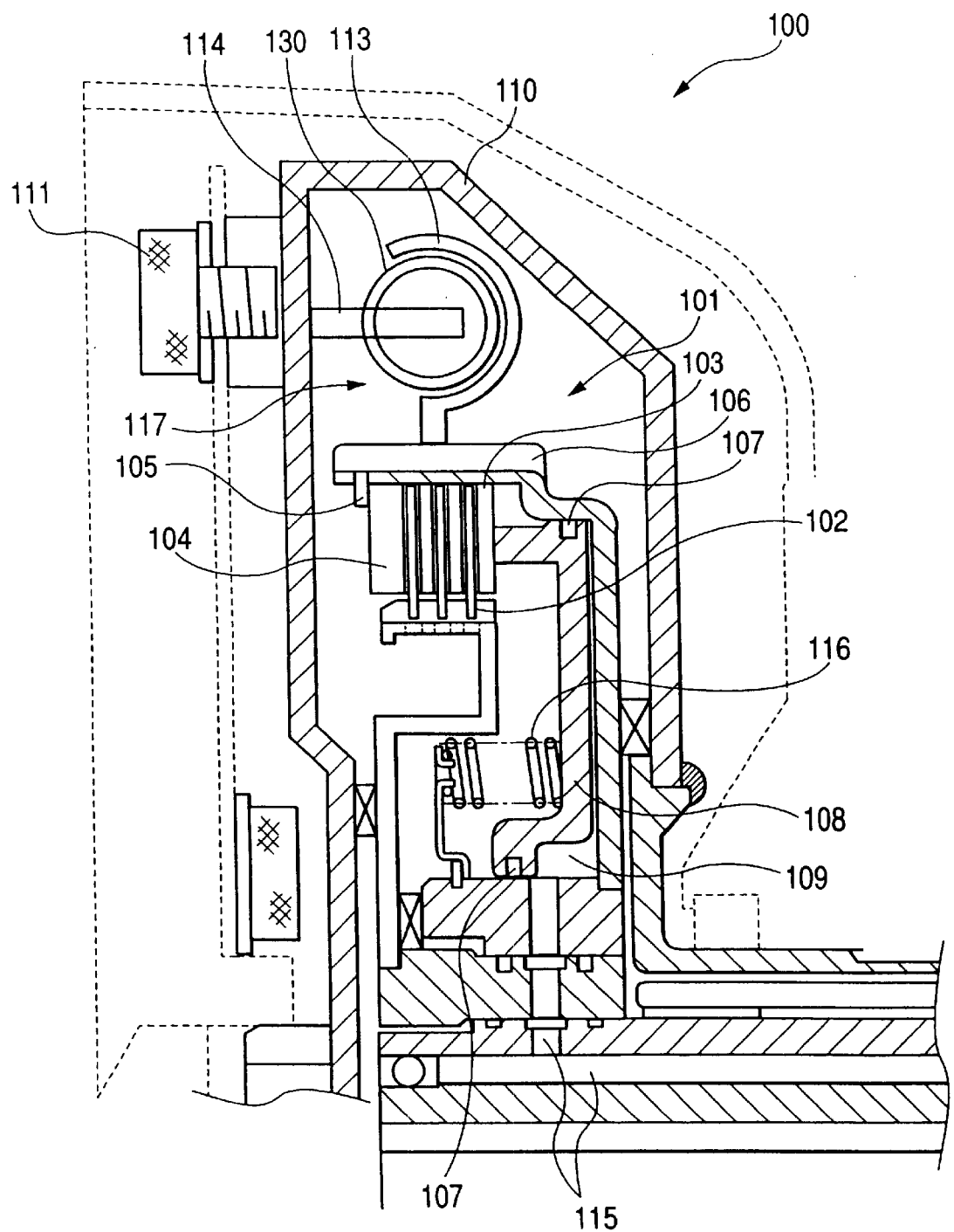
FIG. 2 is an axial sectional view of a conventional starting clutch.

An embodiment of the present invention will now be explained with reference to the accompanying drawings. FIG. 1 is an axial sectional view of a starting clutch according to an embodiment of the present invention.

A starting clutch 10 includes a wet type multi-plate clutch 11. Within a clutch case 16 of the wet type multi-plate clutch 11, substantially annular friction plates 12, which are output side friction engaging elements, are spline-fitted onto outer periphery of a hub 31 and are arranged alternately with substantially annular separator plates 13 and a substantially annular backing plate 14 which are input side friction engaging elements disposed on inner periphery of the clutch case 16. At an axial outer side (left side in FIG. 1), the backing plate 14 is supported by a substantially annular stop ring 15. Although the multi-plate clutch 11 is shown to include four friction plates 12 and four separator plates 13, it should be noted that the number of the friction engaging elements can be changed appropriately in accordance with required torque. Further substantially annular friction members 33 or a plurality of segmented friction members 33 arranged in a circular pattern are, secured to both axial surfaces of each friction plate 12 by bonding or the like of course, such a friction member may be secured to only one surface of each friction plate in accordance with the required torque.

At a right side (in FIG. 1) of the friction engaging elements, there is disposed a piston 18 arranged within the clutch case 16 with an O-ring 17 therebetween, and an oil chamber 19 is defined between the piston 18 and the clutch case 16. Further, within the hub 31, there is disposed a return spring 26 for biasing the piston 18 toward the right (in FIG. 1) so that the friction engaging elements are normally brought to a non-engaged condition. The piston 18 is provided with two urging pieces 18a for urging the friction engaging elements in an axial direction. A cavity is formed between the urging pieces 18a, thereby reducing a weight of the piston 18 and accordingly improving response of the piston 18. Further, a total weight of the clutch case 16 side is reduced.

The starting clutch 10 further comprises a housing 20 covering an outer periphery of the multi-plate clutch 11, and a damper disposed between the clutch case 16 and the housing 20. The housing 20 is connected to an output shaft 21 of an engine (not shown). The damper 27 includes a retainer plate 24, which holds a spring 30 and is attached to an inner wall of the housing 20, and a pawl portion 23 spline-fitted onto the outer periphery of the clutch case 16.

When oil pressure is supplied to the oil chamber 19 through an oil passage 15, the piston 18 is operated to achieve a friction engaging condition. When the oil pressure is turned OFF (released), the non-engaged condition is restored. An oil passage 29 serves to circulate cooling oil.

As can be seen from FIG. 1, in the illustrated embodiment, since the retainer plate 24, which is a member heavier than the pawl portion 23, is attached to the housing 20 and the pawl portion 23 is arranged on the clutch case 16, a weight acting on the clutch case 16 side can be reduced.

In the embodiment as mentioned above, the clutch for the starting clutch, in which the input side elements and the output side elements are frictionally engaged with each other by the axial load, can be for example, a multi-plate clutch, a single-plate clutch or a cone clutch, which are either of a wet type or a dry type. The spring for urging the piston can be for example, a leaf spring, a coil spring or a wave spring.

As mentioned above, according to the starting clutch of the present invention, since the retainer-plate having relatively heavy weight is attached to the housing and the pawl portion having relatively light weight is provided on the clutch case side, a starting clutch which is compact and in which a weight of a clutch side portion is reduced and a disadvantageous condition regarding strength is eliminated can be provided.

Further, since the weight of the clutch side portion is reduced, more compact bearings can be used.

In addition, by spline-fitting the pawl portion, adequate strength can be achieved while maintaining compactness.

What is claimed is:

1. A starting clutch comprising:
   a wet type multi-plate clutch having a clutch case;
   a housing attached to an output shaft of an engine and adapted to cover said wet type multi-plate clutch; and
   a damper disposed between said wet type multi-plate clutch and said housing; and
   wherein said damper includes a spring, a retainer plate for holding said spring, and a pawl portion elastically engaging said spring, and said retainer plate is attached to said housing and said pawl portion is attached to said clutch case, and
   wherein said wet type multi-plate clutch and said damper are disposed in a common cooling oil path.

2. A starting clutch according to claim 1, wherein said pawl portion is spline-connected to said clutch case.

3. The starting clutch according to claim 1, wherein said retainer plate projects from said housing into an interior space of said housing.

4. A starting clutch comprising:
   a multi-plate clutch having a clutch case;
   a housing attached to an output shaft of an engine and adapted to cover said multi-plate clutch; and
   a damper disposed between said multi-plate clutch and said housing and disposed in a common cooling oil path with said multi-plate clutch,
   wherein said damper includes a spring, a retainer plate for holding said spring, and a pawl portion elastically engaging said spring, and said retainer plate is attached to said housing and said pawl portion is attached to said clutch case.

* * * * *